United States Patent

[11] 3,627,339

[72] Inventor Lorenz J. Burweger
  Millington, N.J.
[21] Appl. No. 7,752
[22] Filed Feb. 2, 1970
[45] Patented Dec. 14, 1971
[73] Assignee Lee Controls, Inc.
  Berkeley Heights, N.J.

[54] BRACKET FOR MOUNTING SHAFTS
  4 Claims, 4 Drawing Figs.
[52] U.S. Cl. .................................................. 279/8,
  248/181, 248/230, 269/287, 279/50, 279/96,
  287/52.09
[51] Int. Cl. ...................................................... B23b 31/10
[50] Field of Search ........................................... 279/8, 46,
  50, 51, 53, 95, 96, 102, 103, 1 J, 1 L, 16;
  287/52.04, 52.07, 52.09; 269/74, 75, 77, 78, 287;
  248/181, 182, 230

[56] References Cited
  UNITED STATES PATENTS
  2,404,385 7/1946 Fritts ............................ 279/50 UX
  2,431,476 11/1947 Hall ............................. 279/16
  3,009,747 11/1961 Pitzer .......................... 287/52.09 X
  FOREIGN PATENTS
  1,470,888 1/1967 France ......................... 287/52.09

Primary Examiner—Andrew R. Juhasz
Assistant Examiner—James F. Coan
Attorney—Martha G. Pugh ABSTRACT: A self-aligning mounting bracket for convenience in orienting work pieces comprising cylindrical shafts and rods. The bracket comprises a ball bushing having a cylindrical bore designed to accommodate the cylindrical work shaft. The ball bushing has a peripheral longitudinal slit parallel to the axis of the bore. The slitted ball bushing, including the work piece, fits rotatably between a pair of bearings which are disposed coaxially to form a composite semispherical cavity. The assembled bearing members encasing the ball bushing are fitted at one end into a slightly oversized cylindrical socket in a pedestalled housing by means of a plurality of screws whose heads bear against recessed, slightly oversized holes in the rear face of the housing, and whose shanks are interposed longitudinally in aligned holes in symmetrical positions around the edges of each of the bearing elements. The screws are tightened to urge the two bearing members together against the surface of the slitted ball bushing, and arrest its rotation at a desired position. A plurality of short screws, protruding radially from the oversized cylindrical socket of the housing, bear on the cylindrical surface of the bearing assembly, thereby serving to orient the bearing members in a desired position. The rear face of the housing includes a smaller cylindrical opening concentric with and to the rear of the mounting socket, and somewhat larger than the work shaft, to accommodate a work shaft extending through and beyond the bracket.

PATENTED DEC 14 1971
3,627,339
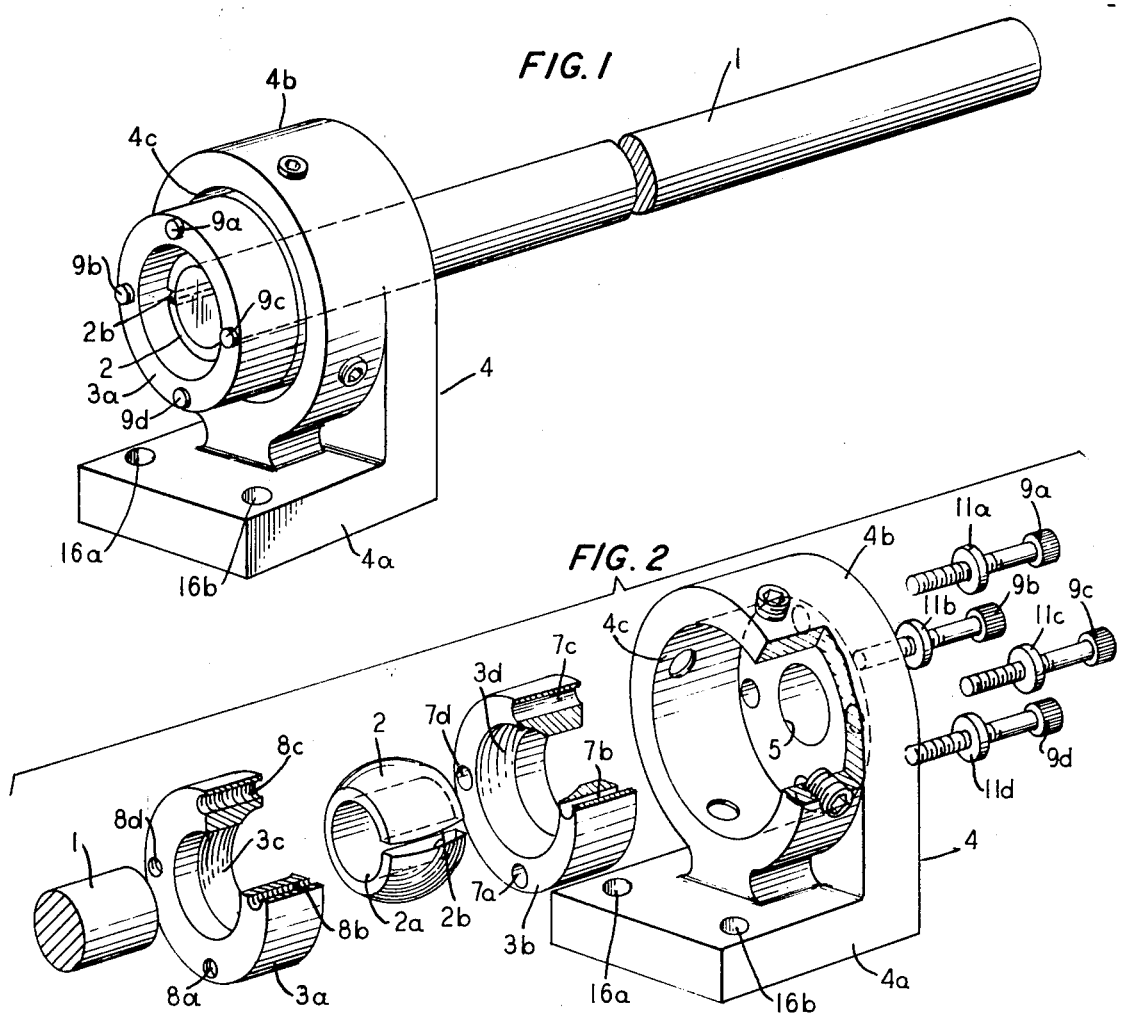
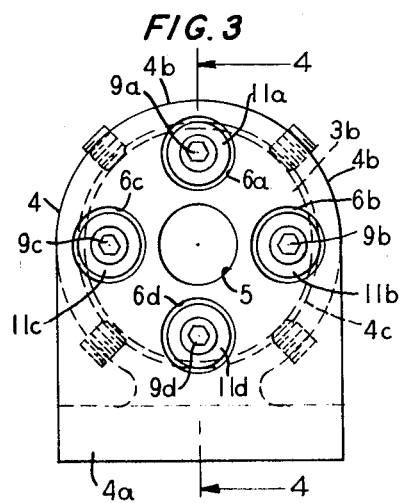
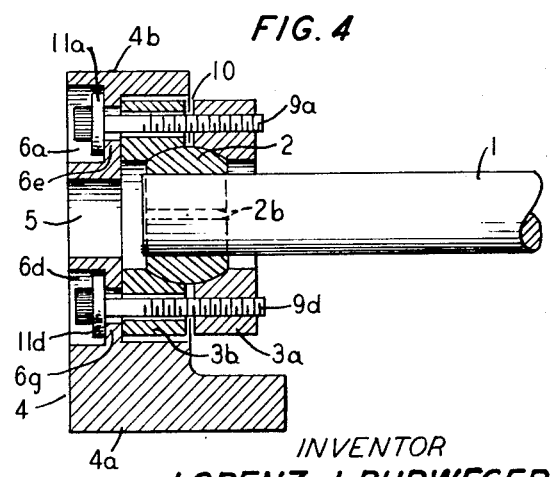
INVENTOR
LORENZ J. BURWEGER
BY Martha Pugh
ATTORNEY

BRACKET FOR MOUNTING SHAFTS

BACKGROUND OF THE INVENTION

This relates in general to mounting brackets, more particularly of a type adapted to control the alignment of linear rods and shafts employed for linear motion bearings.

Numerous types of chucks, jigs, clamps, and mounting brackets have been developed in the prior art for holding a work piece in a desired position relative to a fixed base. The principal disadvantages found in the various types of devices available in the prior art are that they are either too complex, or they unduly limit the degrees of freedom through which the work shaft can be oriented.

The principal object of the present invention is to provide a mechanically simple device whereby a cylindrical shaft can be adjusted through a large number of angular positions with reference to a permanently fixed base. A more particular object is to provide an assembly peculiarly adapted for setting up linear motion shafting on an uneven base surface.

SHORT DESCRIPTION OF THE INVENTION

These and other objects are achieved in accordance with the present invention in a simple mounting bracket having as its central element a ball bushing having an axial bore designed to just accommodate the cylindrical test shaft or rod. The periphery of the ball bushing, which may, for example, be of steel, is slit longitudinally and together with the mounted shaft, it rides rotatively inside of a pair of composite bearing members. The latter, which are externally cylindrical, are mounted coaxially on either side of the ball bushing, and hollowed out inside to form between them a semispherical cavity with two halves slightly spaced apart along the axis with reference to a vertical plane through the center of the ball.

This assemblage is fastened into a supporting frame which includes a slightly oversized cylindrical socket mounted on a supporting base. Four elongated screws, mounted symmetrically about the axis with their heads and outer ends resting in outsized screw holes in the vertical end-face of the supporting frame, extend longitudinally into aligned screw holes on the annular edges of each of the bearing members. When these elongated screws are tightened, the bearing members are urged together, compressing the slitted ball bushing against the mounted shaft, to hold it firmly in a given orientation. Additional screws extend radially inward from the cylindrical surface of the slightly oversized supporting socket as further means to adjust and secure the bearing assembly in a desired orientation. Means are also provided for fastening the support to a selected base. The vertical end-face also includes a cylindrical opening concentric with and to the rear of the cylindrical socket, which is about 20 percent larger in diameter than the shaft of the workpiece, permitting the same to protrude through and beyond the mounting bracket. Thus, the work shaft may be moved longitudinally to any desired position, as well as being adjusted in the desired angular position.

A principal advantage of the device of the present invention is that it permits adjustment of the work shaft through a gamit of angular positions in the *x-y* plane, as well as in either direction along the *z* axis, with reference to a permanently fixed base. Once the work shaft has been oriented in the desired position, it is readily secured in that position by an eight-way screw adjustment. The elongated screws extending transversely through the bearing assemblage, serve to press the two bearing halves together against the ball bushing, arresting the orientation of the shaft in a desired position. The radially directed screws are then tightened for adjusting the longitudinal position of the bracket on the shaft, and making further refined adjustments in its orientation.

The brackets of the present invention are particularly designed to be used in pairs for quickly and easily assembling one or more bars of linear motion shafting on a supporting surface which need not be even, as in prior art practice. The parts of the bracket of the present invention are simple to machine and assemble.

BRIEF DESCRIPTION OF THE DRAWINGS

These and other objects, features, and advantages will be apparent to those skilled in the art from a study of the detailed specification with reference to the drawings, in which:

FIG. 1 is a showing in perspective of the bracket for mounting shafts in accordance with the present invention;

FIG. 2 is an exploded view of the bracket of FIG. 1 with the parts disassembled to show the interior;

FIG. 3 is a cross section along the plane 2—2 of FIG. 1; and

FIG. 4 is a sectional showing as indicated through the plane 4—4 of FIG. 3.

DETAILED DESCRIPTION OF THE INVENTION

Referring simultaneously in detail to FIGS. 1, 2, 3, and 4 of the drawings, element 1 is a cylindrical work shaft of any of the types well known in the art, which is in the process of being oriented in an optimum position, such as may be desirable, for example, in assembling a system of linear motion shafting. Although the solid cylindrical work shaft 1 is shown extended to the right of the drawing in FIG. 1, it will be appreciated that it can also be extended in the other direction if desired for convenience, or the bracket can be mounted in an intermediate position along the shaft.

The work shaft 1, which in the present example is of polished steel, is mounted in the cylindrical bore 2a which is axially disposed in ball bushing 2. The latter which may be formed of any of the metals usually employed for clamps of this type, is made of steel in the present example. It has an outer diameter of 1¼ inch, extends three-fourths inch along the central internal axis, and has a cylindrical bore 2a just exceeding three-fourths inch in diameter, symmetrical about the axis for accommodating the work shaft 1, which in the present example is three-fourths inch in diameter. In addition to the bore 2a, the periphery of the ball bushing 2 is slit transversely, parallel to the axis of the bore, the slit 2b being approximately three thirty-seconds inch wide when the bushing is in a disassembled position.

The bushing 2 is mounted in a composite bearing 3a, 3b each of the halves of which has a hollow semispherical interior, the two halves assembled to form a dual spherical bearing surface 3c, 3d for the rotation of the ball bushing 2. Each of these halves, which are left-hand and right-hand mirror images, comprises a member having an outer cylindrical surface which is 1 15/16 inch in diameter and nine-sixteenths inch along the axis, the interior being hollowed out at the inner end to form a semispherical inner bore having a diameter 1¼ inch at the inner end of the sphere, the spherical portion extending three-eighths inch along the axis, and narrowing at the respective outer end to a cylindrical collar 1 inch in diameter and three-sixteenths inch along the axis.

The cylindrical bearing members 3a, 3b are supported in a housing 4 of, for example, cast iron or steel, of which the lower supporting standard 4a comprises a solid rectangular base substantially 2 inches wide and 2⅝ inches long and one-half inch thick. Along one of the long sides is mounted cylindrical mounting frame 4b, about 2⅝ inches in outer diameter, except for the bottom, which is centered on a support integral with one end of the base portion and extending about one-fourth inch above its face.

The cylindrical mounting frame 4b includes a cylindrical socket 4c symmetrically disposed in one end thereof which is 2 1/16 inches in inner diameter and five-eighths inch along the axis. The backface of the mounting frame 4b, which is flush with the back end of the supporting standard 4a, is closed except for a symmetrically spaced central opening 5 which is seven-eighths inch in diameter and one-half inch along the axis, thereby providing about a one-eighth inch clearance for the cylindrical test rod, which is three-fourths inch in diameter. Opening 5 is surrounded symmetrically by four screw openings, each having an outer recess 6a, 6b, 6c, and 6d, which is nine-sixteenths inch in diameter and five-sixteenths inch deep, and each narrowing to a respective inner bore 6e, 6f, 6g, and 6h. These are five-sixteenths inch in diameter for a depth of three-sixteenths inch, to accommodate elongated screws having shank diameters of three-sixteenths inch, as will be described presently.

When the two bearing members 3a, 3b are assembled face-to-face coaxially, they are disposed to accommodate the ball bushing 2 for rotation in any direction, except as limited by the engagement of shaft 1 with the edge of the enlarged opening 5, and the shafts of screws 9a, 9b, 9c, and 9d in the respective screw openings, as will be explained presently.

Each of the bearing members 3a, 3b has four symmetrically spaced screw holes parallel to its axis, namely 7a, 7b, 7c, and 7d, and 8a, 8b, 8c, and 8d, respectively. These two sets, which are machined to accommodate three-sixteenths inch diameter screws, are designed to be aligned when the two members 3a, 3b are assembled coaxially to include the semispherical ball bushing 2, which accommodates test rod 1. The respective screw holes 7a, 7b, 7c, and 7d, in turn, are matched to the respective screw holes 6a, 6b, 6c, and 6d in the cylindrical mounting frame 4b.

When the bearing members 3a, 3b are coaxially assembled in the cylindrical mounting frame 4b, four longitudinal screws 9a, 9b, 9c, and 9d are interposed peripherally around the cylindrical assembly, extending parallel to its axis, with their heads bearing against four washers 11a, 11b, 11c, and 11d, resting in the bottom of the respective recesses 6a, 6b, 6c, and 6d, in the aligned screw holes, so as to hold the bearing members 3a, 3b in coaxially assembled position in the mounting frame. The ball bushing 2 is still free to move rotatively.

The heads of longitudinal screws 9a, 9b, 9c, and 9d are about five-sixteenths inch in diameter and one-fourth inch deep, each having a hexagonally shaped recess in the center about three-sixteenths inch across and one-eighth inch deep, which is designed to accommodate a hexagonal headed wrench which functions to tighten the screws in place to seat securely against washers 11a, 11b, 11c, and 11d, which are about one-eighth inch thick. The shanks of the longitudinal screws 9a, 9b, 9c, and 9d are each three-sixteenths inch in diameter, so that they fit into the bores 6e, 6f, 6g, and 6h, with a cross-sectional clearance of one-eighth inch in each case, providing maneuverability so that the composite bearing 3a, 3b, including the enclosed shaft, can be raised or lowered, or moved to the left or right, one-eighth inch as the screws 9a, 9b, 9c, and 9d are tightened into recesses 6a, 6 b, 6c, and 6d of supporting frame 4. When the longitudinal screws 9a, 9b, 9c, and 9d are tightened, they tend to close together the gap 10 between the bearing members 3a, 3b, which in turn apply peripheral pressure on ball bushing 2, causing it to tend to close the slit 2b, clamping the cylindrical work piece 1 in a desired position.

In addition, the cylindrical mounting frame 4b is perforated with four symmetrically positioned radially directed screw holes 13a, 13b, (not shown) 13c, and 13d, each about five-sixteenths inch in diameter, which are centered on a circle about five-eighths inch in from the inner face of the frame 4b. Each of these holes is machined to just accommodate a short screw, 14a, 14b, 14c, and 14d, respectively, about three-eighths inch long, having a shank three-sixteenths inch in diameter, which bears on the outer peripheral surface of the bearing member 3b. These serve to adjust the latter in a desired orientation in the mounting socket 4c of the frame 4b, further maneuverability being provided by the ⅛-inch clearance between the cylindrical exterior of composite bearing 3a, 3b and the interior of socket 4c.

The base member 4a of the housing 4 is equipped with screw holes 16a, 16b, so that the clamp may be fastened in place on either a horizontal or vertical surface, as convenient.

Although an example has been disclosed in specific detail as one embodiment of the invention, it will be understood that the invention is not to be construed as limited to the specific details shown by way of example, but that the scope of the invention will be limited only in accordance with the appended claims.

What is claimed is:

1. A mounting bracket comprising in combination a ball bushing having an axial bore constructed to accommodate a cylindrical work shaft, said ball bushing designed to completely surround said shaft in a plane perpendicular to the axis of said shaft except for a peripheral longitudinal slit in a direction transverse to said plane, a composite cylindrical bearing, the two halves being slightly spaced apart, and forming internally between them a semispherical cavity in which the said ball bushing is rotatably seated, the respective annular edge portions of said cylindrical bearings having a plurality of longitudinally aligned screw holes, means for mounting the assembled bearing halves forming said composite cylindrical bearing including said ball bushing, comprising a base supporting a cylindrical frame including a socket having a partial closure at one end, an axial opening in the center of said partial closure, said central opening having a diameter substantially exceeding that of the cylindrical work shaft, said partial closure including a plurality of screw holes symmetrically surrounding said central opening, a plurality of screws having elongated shanks each designed to be accommodated in a corresponding one of the screw holes surrounding said central opening, and to extend through corresponding longitudinally aligned screw holes in said bearing members, said screws constructed upon being tightened in said screw holes to urge said bearing members together against the surface of said ball bushing, thereby tending to urge the slit in said ball bearing to close, means for securing and orienting the assemblage including said bearings in said socket, and means for securing the base to a flat surface.

2. The combination in accordance with claim 1 wherein the socket in said means for mounting said assembled bearing halves has a diameter substantially larger than the outer diameter of said cylindrical bearing to provide maneuverability in the orientation of said cylindrical work shaft.

3. The combination in accordance with claim 1 wherein each of the screw holes surrounding the central opening of said partial closure has a diameter substantially exceeding the diameter of the elongated shanks of the matching screw, to provide maneuverability in the orientation of said cylindrical work shaft.

4. The combination in accordance with claim 1 wherein said means for securing and orienting the assemblage including said bearings in said socket comprises a plurality of radially directed screws protruding at symmetrical positions from the interior of said socket, said radially directed screws adjusted to bear on the periphery of one of said bearing halves.

* * * * *

UNITED STATES PATENT OFFICE
CERTIFICATE OF CORRECTION

Patent No. 3,627,339　　　　　　　　Dated December 14, 1971

Inventor(s) LORENZ J. BURWEGER

It is certified that error appears in the above-identified patent and that said Letters Patent are hereby corrected as shown below:

The drawings should be corrected to show that:

-- In Fig. 2, the cylindrical mounting frame is perforated with four symmetrically positioned radially directed screw holes 13a, 13b, (not shown) 13c, and 13d. Each of these holes is machined to receive a short screw, 14a, 14b, 14c, and 14d, which bears on the outer peripheral surface of the bearing member 3b, as shown in Figs. 1, 2 and 3. -- .

Signed and sealed this 20th day of November 1973.

(SEAL)
Attest:

EDWARD M. FLETCHER, JR.　　　　　　RENE D. TEGTMEYER
Attesting Officer　　　　　　　　　Acting Commissioner of Patents